United States Patent
Degenholtz et al.

(10) Patent No.: US 6,705,570 B1
(45) Date of Patent: Mar. 16, 2004

(54) ARRANGEMENT AND ASSOCIATED SYSTEM HAVING AN ACTUATOR AND A TUBULAR FLAP-DRIVE MEMBER ABOUT THE ACTUATOR

(75) Inventors: Arthur Degenholtz, Teaneck, NJ (US); Edward Mayer, West Orange, NJ (US); Naresh P. Vaghela, Bristol (GB)

(73) Assignee: Curtiss-Wright Controls, Inc., Gastonia, NC (US)

( * ) Notice: Subject to any disclaimer, the term of this patent is extended or adjusted under 35 U.S.C. 154(b) by 0 days.

(21) Appl. No.: 10/413,249

(22) Filed: Apr. 14, 2003

(51) Int. Cl.$^7$ ................................................ B64C 9/02
(52) U.S. Cl. .................................. 244/75 R; 244/213
(58) Field of Search ............................... 244/75 R, 213, 244/214, 215, 216, 217, 76 A, 221, 231, 232, 333

(56) References Cited

U.S. PATENT DOCUMENTS

| | | | | |
|---|---|---|---|---|
| 3,904,152 A | * | 9/1975 | Hill | 244/214 |
| 3,935,754 A | * | 2/1976 | Comollo | 74/665 F |
| 4,469,297 A | * | 9/1984 | Cole | 244/215 |
| 4,603,594 A | * | 8/1986 | Grimm | 74/89.39 |
| 4,760,907 A | * | 8/1988 | Avny | 192/141 |
| 4,779,822 A | * | 10/1988 | Burandt et al. | 244/75 R |
| 4,932,613 A | * | 6/1990 | Tiedeman et al. | 244/213 |
| 4,979,700 A | * | 12/1990 | Tiedeman et al. | 244/75 R |
| 5,779,587 A | * | 7/1998 | Reilly | 475/263 |
| 6,231,012 B1 | * | 5/2001 | Cacciola et al. | 244/213 |
| 6,260,799 B1 | * | 7/2001 | Russ | 244/49 |
| 6,443,034 B1 | * | 9/2002 | Capewell et al. | 74/665 GA |
| 2003/0127569 A1 | * | 7/2003 | Bacon et al. | 244/195 |

* cited by examiner

*Primary Examiner*—Charles T. Jordan
*Assistant Examiner*—S A Holzen
(74) *Attorney, Agent, or Firm*—Pearne & Gordon LLP

(57) ABSTRACT

An arrangement, and an associated system, in which an actuator is utilized to move a flap. Within the arrangement, an actuator conveys motive force from a motor to cause movement of the flap relative to a supporting structure. A tube of the arrangement is operatively connected to the actuator and movable relative to the support structure in response to motive force conveyed by the actuator. The tube is for operative connection to the flap and is for moving of the flap. The actuator is located radially within an envelope of the tube. Within the system, a controller controls the motor.

27 Claims, 7 Drawing Sheets

ARRANGEMENT AND ASSOCIATED SYSTEM HAVING AN ACTUATOR AND A TUBULAR FLAP-DRIVE MEMBER ABOUT THE ACTUATOR

FIELD OF THE INVENTION

The present invention relates to an arrangement, and an associated system, in which an actuator is utilized to move a flap, and particularly relates to an arrangement and an associated system, that provides a unique interconnection between the actuator and the flap.

BACKGROUND OF THE INVENTION

High-lift systems that modify and control the lift characteristics of aircraft wings, typically include a series of flaps or slats located on the leading edge and on the trailing edge of the aircraft wings. The motion of the flaps is typically controlled by actuators that connect the flaps to the wing structure. The actuators are typically driven by torque shafts. The torque shafts are driven by a central power drive unit, which may be either hydraulically or electrically powered.

Such known high-lift systems typically utilize two or more actuators on each flap. For optimum mechanical efficiency, the actuators, the torque shafts and the central power drive unit should be mounted along a straight line leading from the central power drive unit through to each of the actuators. Practical considerations such as the need to avoid other wing mounted structures typically prevents this optimum alignment from occurring in these conventional systems. The resulting configuration typically results in the conventional system having various angle gearboxes in the drive train and an increased number of torque shafts that are arranged to avoid the other wing mounted structures, while connecting the actuators and the power drive unit. The use of torque shafts also requires the use of torque shaft bearings to prevent excessive deflection of the torque shafts during operation.

SUMMARY OF THE INVENTION

In accordance with one aspect, the present invention provides a flap drive arrangement. An actuator of the arrangement conveys motive force from a motor to cause movement of a movable flap relative to a supporting structure. A tube of the arrangement is operatively connected to the actuator and movable relative to the support structure in response to motive force conveyed by the actuator. The tube is for operative connection to the flap and is for the moving of the flap. The actuator is located radially within an envelope of the tube.

In accordance with another aspect, the present invention provides a flap and drive arrangement. The arrangement includes a flap movable relative to a supporting structure, a motor that provides motive force and an actuator that conveys motive force from the motor. A tube of the arrangement is operatively onnected between the actuator and the flap and is movable relative to the support structure in response to motive force conveyed by the actuator to cause the movement of the flap. The actuator is located radially within an envelope of the tube.

In accordance with another aspect, the present invention provides a system that includes a flap movable relative to a supporting structure and a motor that provides motive force. The system includes an actuator that conveys motive force from the motor and a tube operatively connected between the actuator and the flap. The tube is movable relative to the support structure in response to motive force conveyed by the actuator to cause the movement of the flap. The actuator is located radially within an envelope of the tube. A control means of the system controls the motor.

BRIEF DESCRIPTION OF THE DRAWINGS

The foregoing and other features and advantages of the present invention will become apparent to the person of ordinary skill in the art upon reading the description and review of the accompanying drawings, in which.

DESCRIPTION OF EXAMPLES OF THE INVENTION

Figure 1:
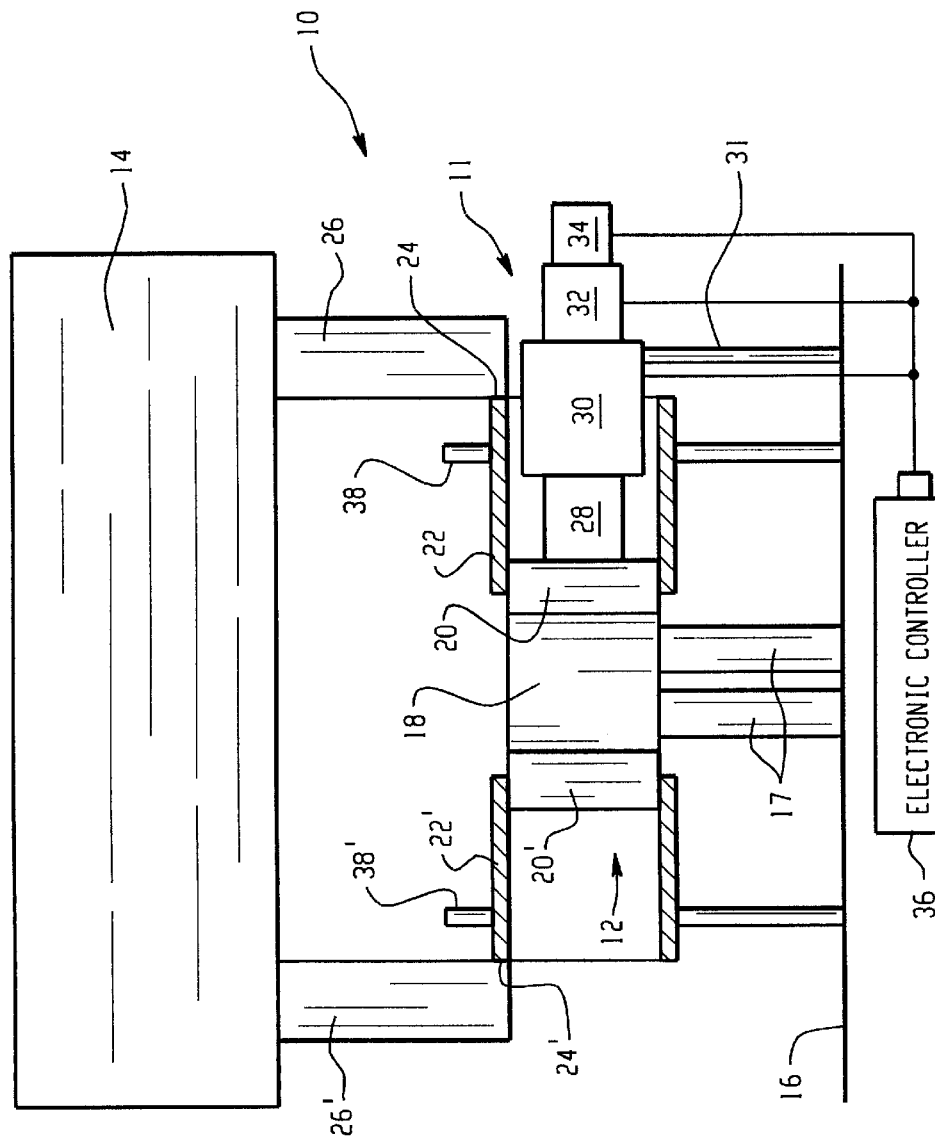
FIG. 1 is a schematic illustration of a first example actuator and flap arrangement, in accordance with the present invention, which has two example actuator portions within a system.

An example system 10, which includes an arrangement 11 in accordance with the present invention, is schematically shown in FIG. 1. The arrangement 11 includes an actuator 12 that transfers motive force. In general, the system 10 is for movement (i.e., driving) of a flap 14. In one specific example, the system 10 is part of an aircraft and the flap 14 is a movable portion of the aircraft. Specifically, the flap 14 may be a movable portion on either a right wing or a left wing of the aircraft. Also the flap 14 may be at the trailing edge of the wing, or may be at a leading edge (i.e., a slat) of a wing. Such an aircraft flap 14 may be a high lift surface.

In the schematically illustrated example of FIG. 1, the actuator 12 is a rotary actuator, and the actuator is positioned between the flap 14 and an aircraft structure 16 (e.g., wing structure). The rotary actuator 12 contains a fixed portion (e.g., a fixed ring gear) 18 and two movable portions (e.g., movable ring gears) 20, 20'. The fixed ring gear 18 is fixedly connected to the aircraft structure 16. The fixed connection is represented by two lugs 17.

The movable ring gears 20, 20' rotate relative to the fixed ring gear 18 during operation of the actuator 12. As such, the movable ring gears 20, 20' are the output gears for the actuator 12. A rotary gear train 19 (FIG. 1A) is present within the actuator 12 to cause actuator operation and thus the rotation of the movable ring gears 20, 20'. It is to be appreciated that any suitable gear train 19 construction may be utilized within the actuator 12. In the example shown in FIG. 1A, a sun gear device 21 is operatively engaged with planet gears 23. The planet gears 23 are operatively engaged with both the fixed ring gear 18 and the movable ring gears 20, 20' at the final output.

The sun gear device 21 may be a multi-component device. For example, the sun gear device 21 may include a primary sun gear 21-1, planet gears 21-2, and a secondary sun gear 21-3. Such gear stages provide for a larger gearing ratio between input and output. In one specific example, the actuator 12 has a relatively large gear ratio and is incorporated within a relatively small overall mounting envelope. An example of such a type of construction is a Curtiss-Wright Power Hinge™. Another example may be provided by U.S. Pat. No. 5,779,587 assigned to Curtiss-Wright Flight Systems, Inc.

Each movable ring gear (e.g., 20) is fixedly attached to a torque tube (e.g., 22) via a spline or other attachment means. In the illustrated example, the arrangement 11 includes two torque tubes 22, 22'. Each torque tube (e.g., 22) is hollow and extends along an axis. In one example, each tube (e.g., 22) is generally cylindrical in shape. The hollow aspect of each torque tube provides an envelope area that is radially within the outer extent of the torque tube. It is to be appreciated that the envelope area provided by each tube does not terminate precisely at the end of the torque tube, but, due to the relative elongate size of the tube, naturally extends out from each end of the tube. The torque tubes 22, 22' may be made of metal, for example steel, or may be made of aluminum or titanium or of a composite material, such as high modulus graphite epoxy which provides a desired combination of strength and weight characteristics.

Figure 1A:
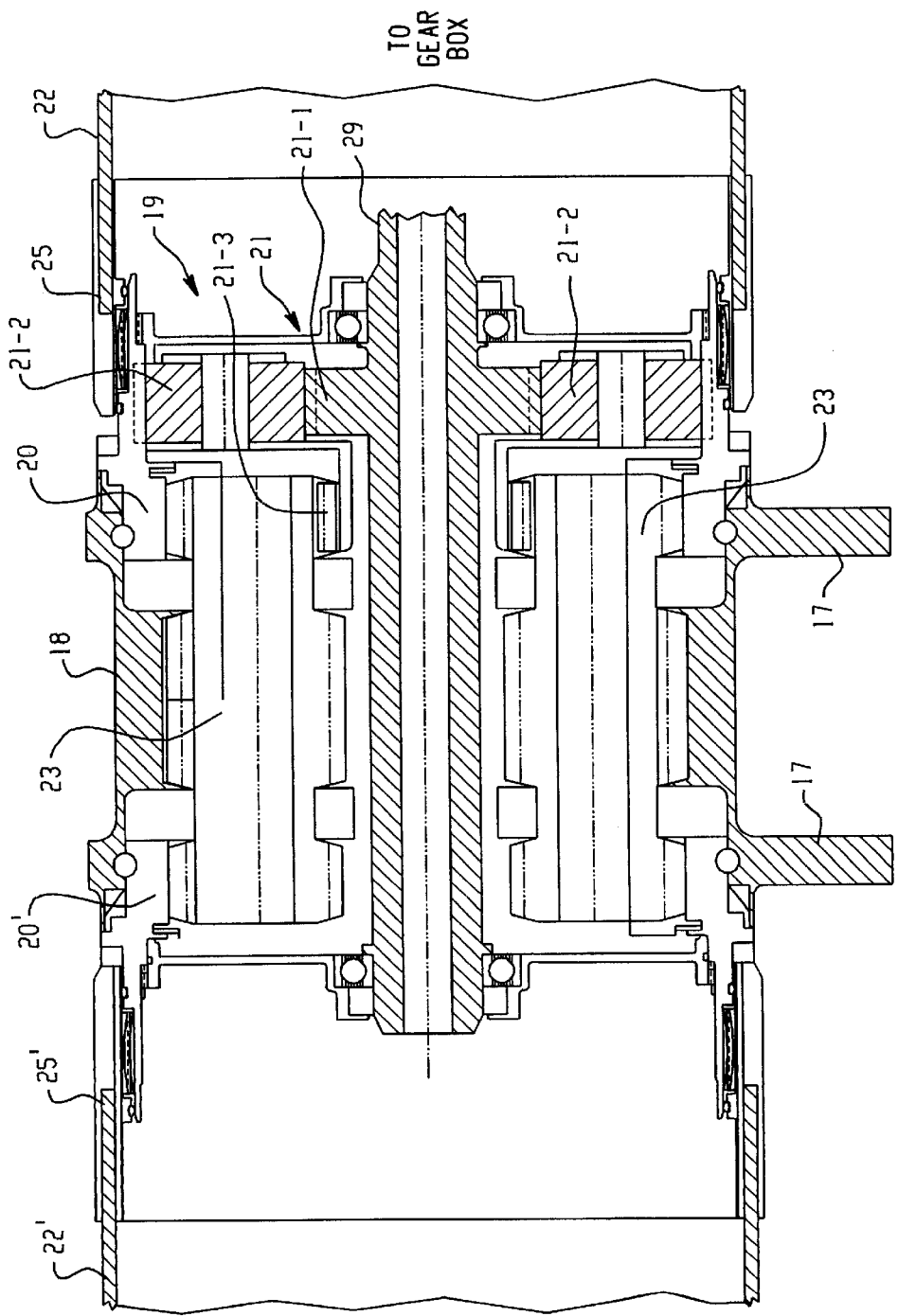
FIG. 1A is pictorial view, partially in section, showing portions of two torque tubes and the associated actuator portions of FIG. 1.

FIG. 1A schematically illustrates one example of the attachment of the torque tubes 22, 22' to the respective movable ring gears 20, 20'. Specifically, each torque tube (e.g., 22) is attached to the respective movable ring gear (e.g., 20) via a spline connection at an axially inner end(e.g., 25).

For each torque tube (e.g., 22), an axially outer end (e.g., 24) incorporates a driving connection for driving the flap 14. In the example of FIG. 1, the end (e.g., 24) of the torque tube (e.g., 22) is connected to an arm (e.g., 26). In turn, the arm (e.g., 26) is connected to the flap 14.

The connections between the ends 24, 24' of the torque tubes 22, 22' and the arms 26, 26' may include intermeshing connections or other driving connections. As an alternative, each torque tube (e.g., 22) and the associated arm (e.g., 26) may be fabricated as a unitary member.

The rotary actuator 12 is mounted inside the envelope of at least one of the torque tubes (e.g., 22), thus reducing the overall size of the arrangement 11. Specifically, in the example of FIG. 1, part of the actuator 12 is located directly radially inside both of the tubes 22, 22'. Further, the entire actuator 12 is located radially within the outermost boundary of the tubes 22, 22'.

The rotary actuator 12 is operatively connected to be driven by a gearbox 28. Specifically, the gearbox 28 is connected (e.g., via a drive shaft 29, as seen in FIG. 1A) to the sun gear device. An electric motor 30 is operatively connected to the gearbox 28 and provides motive force to the gearbox. The electric motor 30 may be either AC or DC operated dependent upon aircraft design. The combination of the gear ratio of the rotary actuator 12 and the gear box 28 provides the desired gear ratio between output of the electric motor 30 and movement of the flap 14.

In the illustrated example, the gearbox 28 and part of the motor 30 are located directly, radially within the torque tube 22. Thus, compactness is achieved. It is to be appreciated that the motor 30 is fixed relative to the aircraft structure 16 by structure 31.

In the illustrated example, an electrically operated holding brake 32 is provided. The example holding brake 32 is a spring-to-apply and electric power-to-release unit in which the holding force is developed by a mechanical spring acting against brake plates. The holding brake 32 may include either dual or triple redundant solenoid coils, which, when electrically powered overcome the spring force to release the brake. The use of redundant solenoid coils provides increased reliability as compared with the use of a single solenoid coil. In the illustrated example, a resolver 34 is also provided. The resolver 34 senses the rotary position of the motor 30, which is related through the gear ratio of the arrangement 11 to the rotary position of the aircraft flap 14. Alternatively, the resolver 34 may be mounted elsewhere (e.g., on the aircraft flap 14).

In the illustrated example, the system 10 includes a single electronic controller 36, which eliminates the need for multiple controllers. The controller 36 is operatively connected to the motor 30, the brake 32, and the resolver 34. The controller 36 includes power electronics for motor control and signal processing circuiting for processing signals from the resolver 34, the motor 30, etc. The types of power electronics and signal processing circuits used in the invention are well known and commonly used in the art.

In the illustrated example, support bearings 38, 38' provide additional support for the torque tubes 22, 22'. It is contemplated that the support bearings 38, 38' may be eliminated if such additional support of the torque tubes 22, 22' is not needed. Elimination of the support bearings 38 may depend in part on the anticipated aerodynamic loads on the flap 14 in an individual application of the system 10 and the required size of the flap.

The present invention provides for the flap 14 to be driven by a single actuator 12. Also, present invention provides for a compact configuration due to the torque tube use. Further, positioning the actuator 12 and the motor 30 near the location of the flap 14 eliminates the need for extended transmission components that would be necessary if the flap were driven from a centrally located power drive unit.

Figure 2:
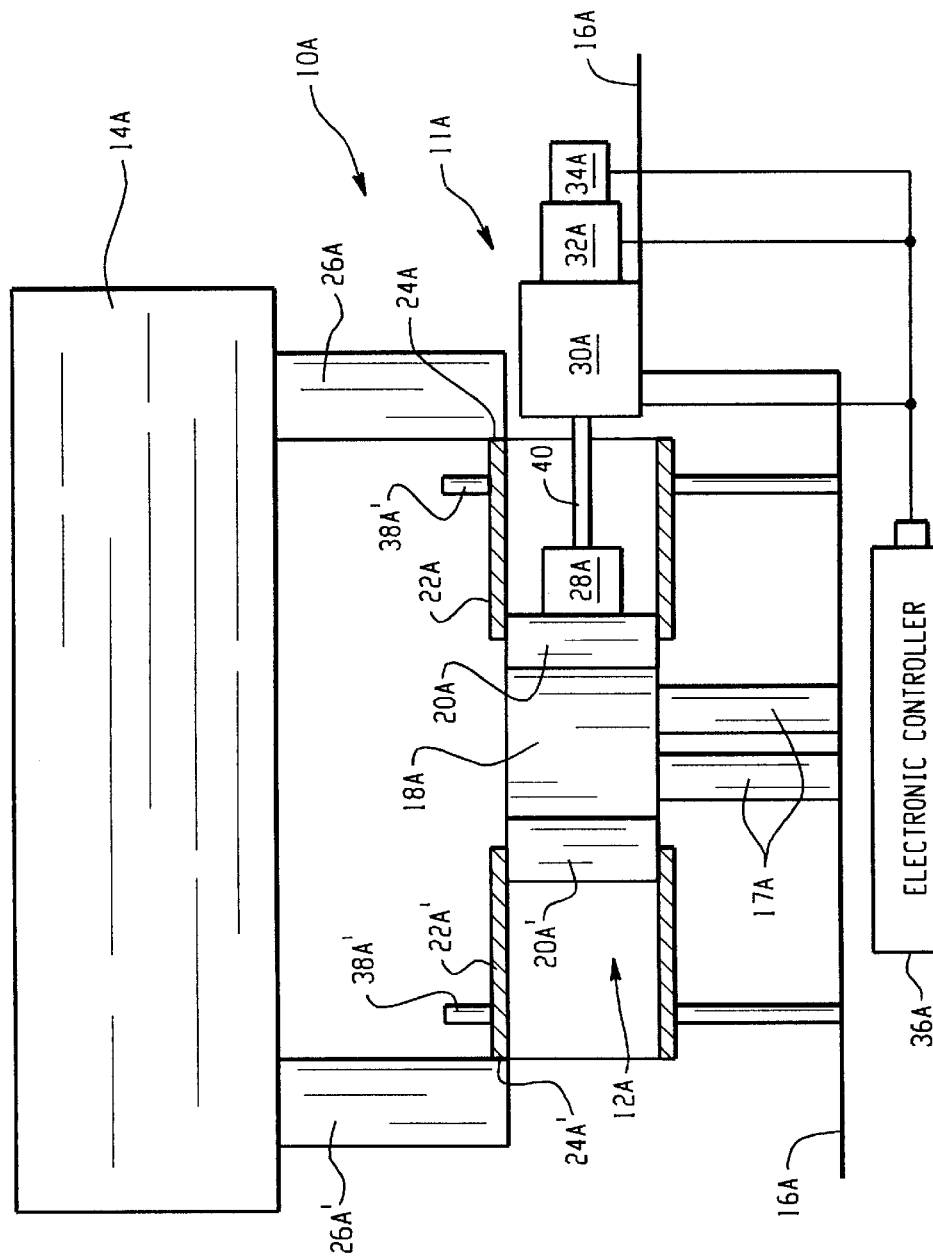
FIG. 2 is a schematic illustration of a second example system that has an actuator and flap arrangement in accordance with the present invention.

Another embodiment of a system 10A, which includes an arrangement 11A in accordance with the present invention, is schematically shown in FIG. 2. The embodiment of FIG. 2 is similar to the embodiment of FIG. 1. As such, corresponding structural elements are identified on FIG. 2 using the same reference numerals as in FIG. 1, but with the addition of the alphabetic suffix "A" affixed thereto. The embodiment shown in FIG. 2 is similar to the embodiment of FIG. 1, in that the actuator 18A is located radially within the tubes 22A. 22A'.

The additional feature shown in the embodiment of FIG. 2 is that a torque shaft 40 may be used to connect the electric motor 30A to the gearbox 28A. As such, the motor 30A may be located at a greater distance from the gearbox 28A. In the illustrated example, the motor 30A is located axially outside of the torque tube 22A. With the motor 30A outside of the torque tube 22A, the mounting of the electric motor may have any conventional connection to the aircraft structure 16A.

Figure 3:
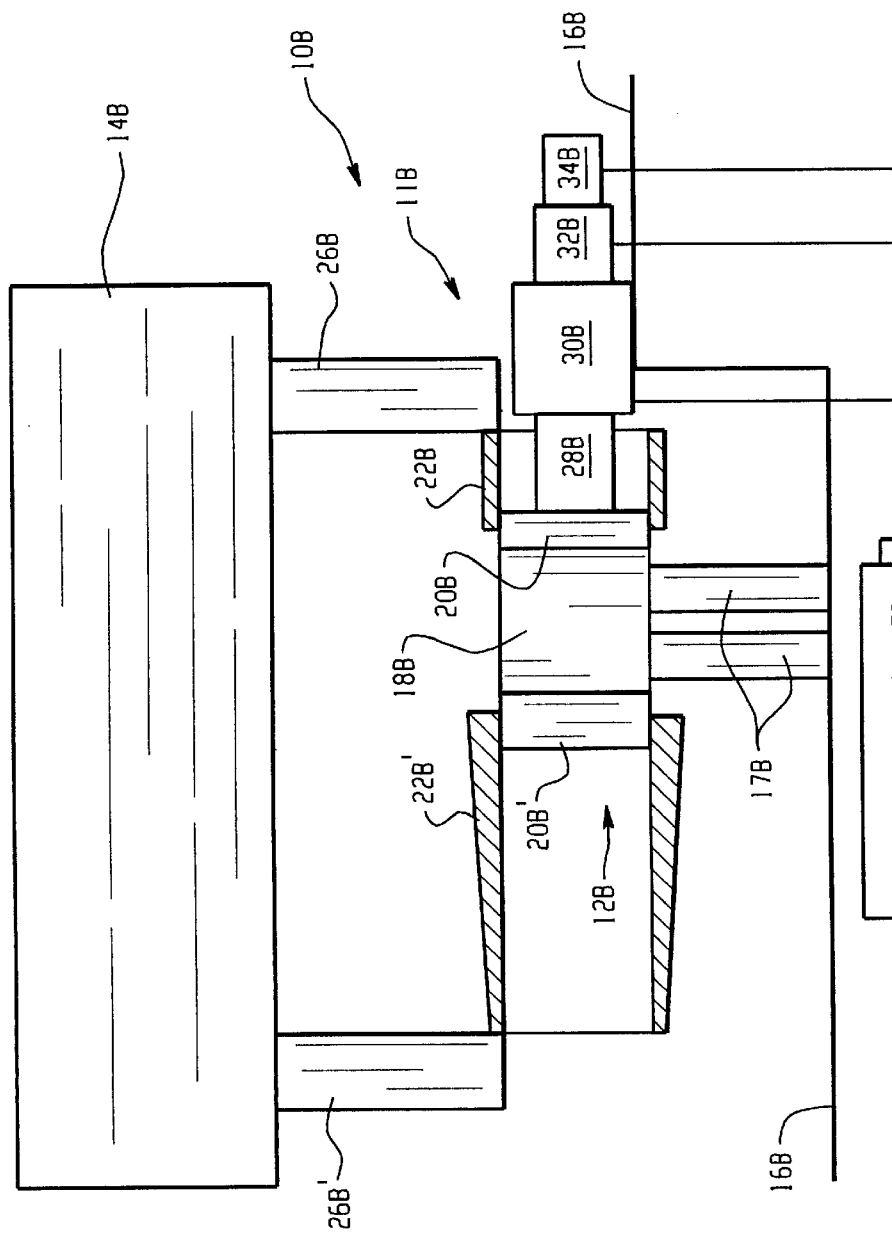
FIG. 3 is a schematic illustration of a third example system that has an actuator and flap arrangement in accordance with the present invention.

Another embodiment of a system 10B, which includes an arrangement 11B in accordance with the present invention, is schematically shown in FIG. 3. The embodiment of FIG. 3 is similar to the embodiment of FIG. 1. As such, corresponding structural elements are identified on FIG. 3 using the same reference numerals as in FIG. 1, but with the addition of the alphabetic suffix "B" affixed thereto. The embodiment shown in FIG. 3 is similar to the embodiment of FIG. 1, in that the actuator 18B is located radially within the tubes 22B. 22B'.

The difference of the system 10B is that the arrangement 11B has one relatively short torque tube 22B and one relatively long torque tube 22B'. The rotary actuator 12B is thus close to one end of the flap 14B. Such a construction provides for ease of mounting the electric motor 30B on the aircraft structure 16B without the need for the torque shaft 40 shown FIG. 2. In the illustrated example, the relatively long torque tube 22B' has a tapered (e.g., non-constant) thickness along the axial direction. Such tapering provides a matching of the torsional stiffness of the longer and shorter torque tubes.

Figure 4:
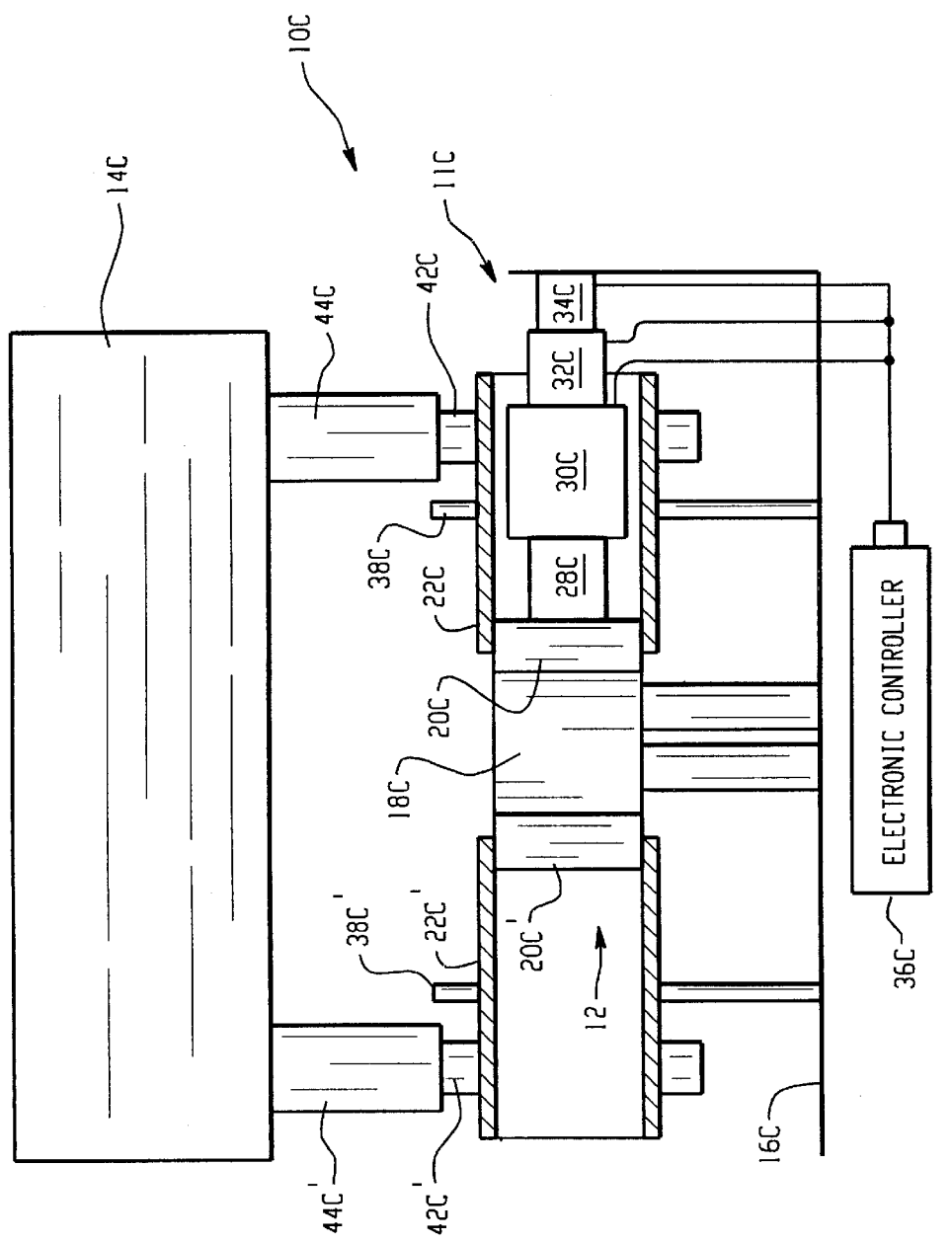
FIG. 4 is a schematic illustration of a fourth example system that has an actuator and flap arrangement in accordance with the present invention, wherein torque tubes are connected to spur gears.

Another embodiment of a system 10C, which includes an arrangement 11C in accordance with the present invention, is schematically shown in FIG. 4. The embodiment of FIG. 4 is similar to the embodiment of FIG. 1. As such, corresponding structural elements are identified on FIG. 4 using the same reference numerals as in FIG. 1, but with the addition of the alphabetic suffix "C" affixed thereto. The embodiment shown in FIG. 4 is similar to the embodiment of FIG. 1, in that the actuator 18C is located radially within the tubes 22C, 22C'.

Within the structure shown in FIG. 4, the system 10C includes spur gears 42, 42' and drive racks 44, 44' to transfer motive force from the torque tubes 22C, 22C'. Thus, arms 26, 26' as shown in the embodiment of FIG. 1 are not utilized in the embodiment of FIG. 4.

Figure 5:
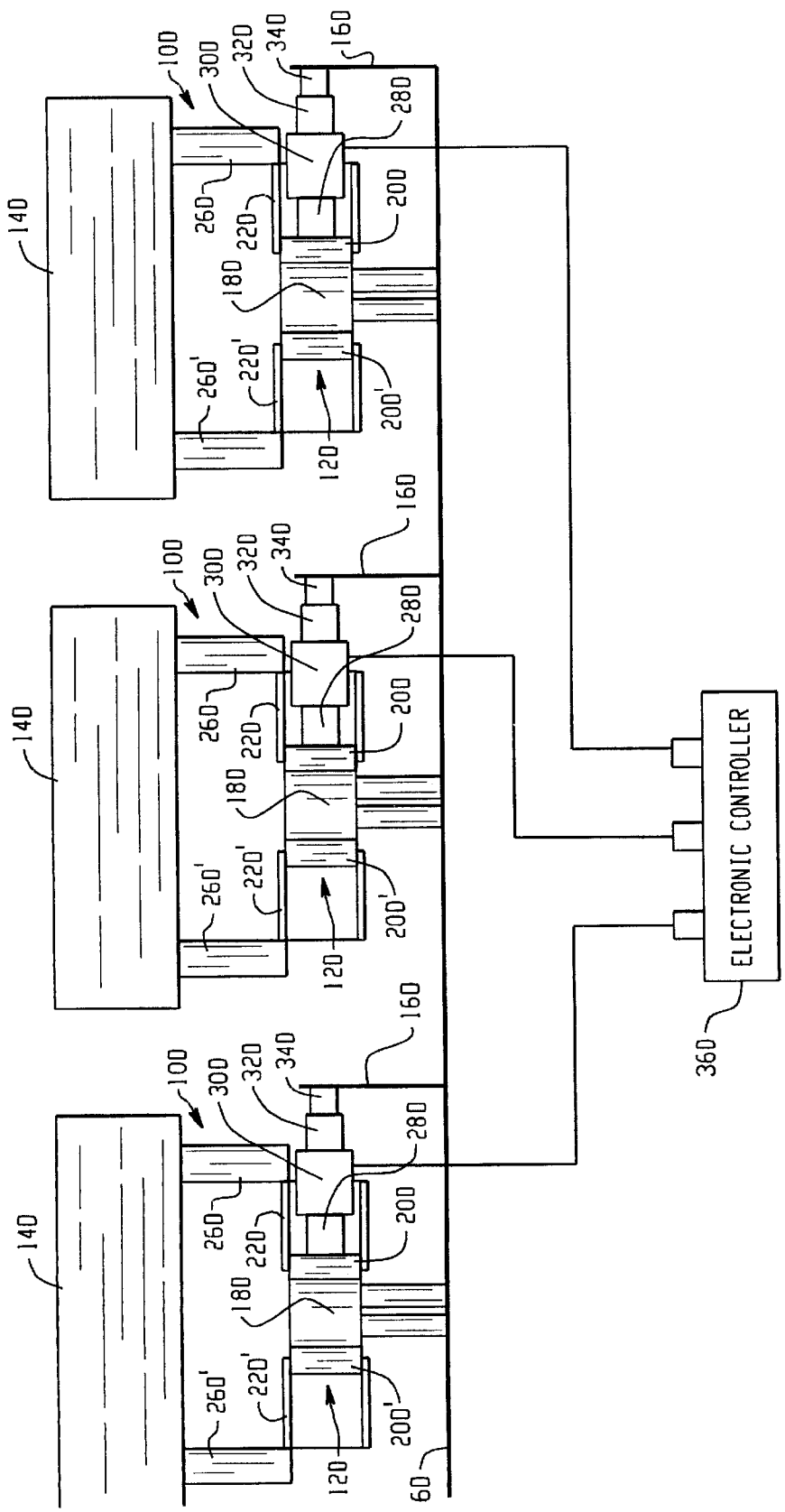
FIG. 5 is a schematic illustration of a fifth example system that contains a plurality of actuator and flap arrangements in accordance with the present invention.

As shown in FIG. 5, several systems 10D may be utilized on an aircraft wing. The systems are identical or similar to the embodiment of FIG. 1. As such, corresponding structural elements are identified on FIG. 5 using the same reference numerals as in FIG. 1, but with the addition of the alphabetic suffix "D" affixed thereto. In the illustrated example of FIG. 5, a single electronic controller 36D is utilized for the several systems 10D. In one example, the several systems 10D provide high-lift. Also, in one example, the flaps 14D are mounted along a leading edge of an aircraft wing.

Figure 6:
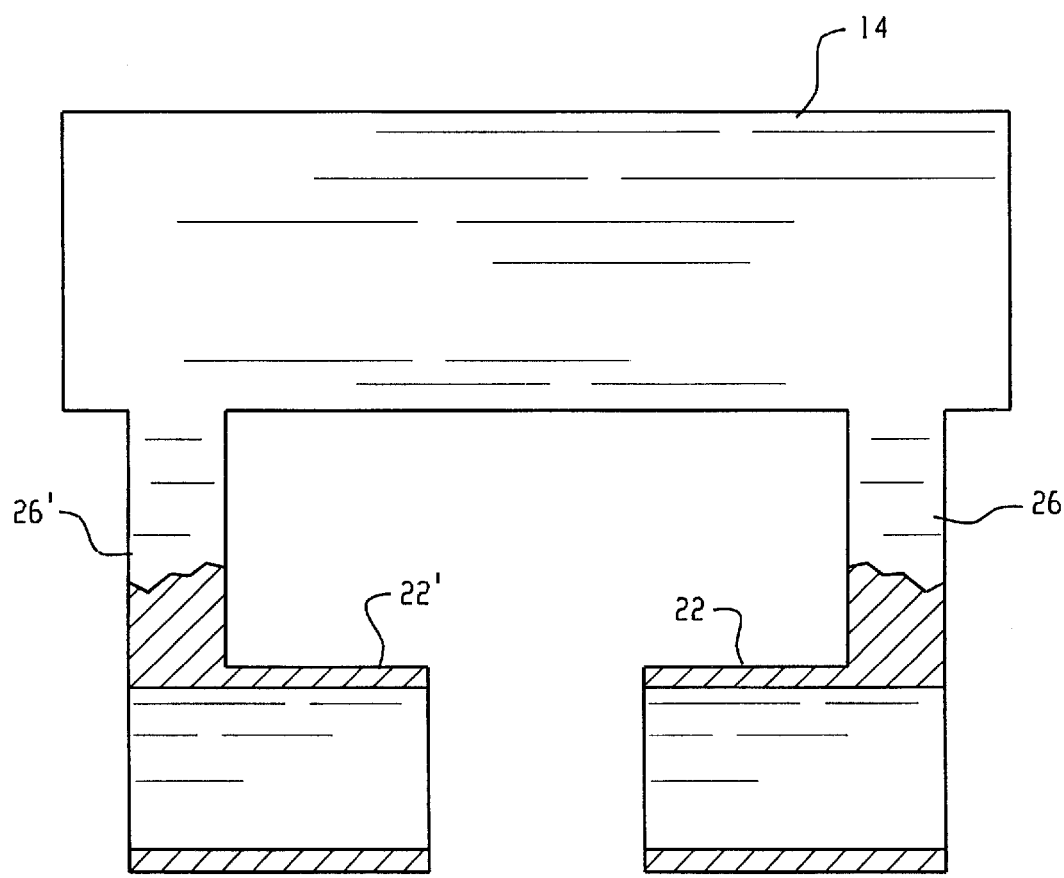
FIG. 6 is a plan view partially in section showing a unitary flap and torque tube.

FIG. 6 shows another embodiment of the invention in which the flap 14, the arms 26, 26' and the torque tubes 22, 22' of FIG. 1 are formed as a unitary member.

From the above description of the invention, those skilled in the art will perceive improvements, changes and modifications in the invention. Such improvements, changes and modifications within the skill of the art are intended to be covered by the appended claims.

Having described the invention, the following is claimed:

1. A flap drive arrangement including:
   an actuator for conveying motive force from a motor to cause movement of a movable flap relative to a supporting structure; and
   a tube, operatively connected to the actuator and movable relative to the support structure in response to motive force conveyed by the actuator, for operative connection to the flap and for moving of the flap, wherein the actuator being located radially within an envelope of the tube.

2. An arrangement as set forth in claim 1, wherein the tube has a cylindrical shape.

3. An arrangement as set forth in claim 1, wherein the actuator is located at least partially directly radially within the tube.

4. An arrangement as set forth in claim 1, wherein the arrangement includes a motor operatively connected to the actuator and located radially within the envelope of the tube.

5. An arrangement as set forth in claim 4, including a gearbox interposed between the motor and the actuator for providing the operative connection between the motor and the actuator.

6. An arrangement as set forth in claim 5, including a shaft interposed between the motor and the actuator, the gearbox and the shaft providing the operative connection between the motor and the actuator.

7. An arrangement as set forth in claim 1, wherein the tube includes means for drivingly engaging a portion of the flap.

8. An arrangement as set forth in claim 1, wherein the tube and the flap are provided as a unitary member.

9. An arrangement as set forth in claim 1, wherein the actuator has a portion fixed relative to the supporting structure and a movable portion connected to the tube.

10. An arrangement as set forth in claim 9, wherein the movable portion of the actuator is spline-connected to the tube.

11. A flap and drive arrangement including:
    a flap movable relative to a supporting structure;
    a motor that provides motive force;
    an actuator that conveys motive force from the motor; and
    a tube, operatively connected between the actuator and the flap, movable relative to the support structure in response to motive force conveyed by the actuator to cause the movement of the flap, wherein the actuator being located radially within an envelope of the tube.

12. An arrangement as set forth in claim 11, wherein the tube has a cylindrical shape.

13. An arrangement as set forth in claim 11, wherein the actuator is located at least partially directly radially within the tube.

14. An arrangement as set forth in claim 11, wherein the arrangement includes a motor operatively connected to the actuator and located radially within the envelope of the tube.

15. An arrangement as set forth in claim 14, wherein the motor is the only motor provided within the arrangement.

16. An arrangement as set forth in claim 14, including a gearbox interposed between the motor and the actuator for providing the operative connection between the motor and the actuator.

17. An arrangement as set forth in claim 16, including a shaft interposed between the motor and the actuator, the gearbox and the shaft providing the operative connection between the motor and the actuator.

18. An arrangement as set forth in claim 11, wherein the tube includes means for drivingly engaging a portion of the flap.

19. An arrangement as set forth in claim 11, wherein the tube and the flap are provided as a unitary member.

20. An arrangement as set forth in claim 11, wherein the tube and the flap interconnected with an intermeshing connection.

21. An arrangement as set forth in claim 11, wherein the actuator has a portion fixed relative to the supporting structure and a movable portion connected to the tube.

22. An arrangement as set forth in claim 11, wherein the tube is a first tube, the arrangement including a second tube, operatively connected between the actuator and the flap, movable relative to the support structure in response to motive force conveyed by the actuator to cause the movement of the flap.

23. An arrangement as set forth in claim 22, wherein the second tube has an axial length that is different from an axial length of the first tube.

24. An arrangement as set forth in claim 22, wherein the actuator is located adjacent to one end of the flap, and distal from the other end of the flap.

25. An arrangement as set forth in claim 22, wherein one of the first and second tubes has a thickness that is tapered along an axial extent.

26. A system including:

a flap movable relative to a supporting structure;

a motor that provides motive force;

an actuator that conveys motive force from the motor;

a tube, operatively connected between the actuator and the flap, movable relative to the support structure in response to motive force conveyed by the actuator to cause the movement of the flap, wherein the actuator being located radially within an envelope of the tube; and control means for controlling the motor.

27. A system as set forth in claim 26, wherein the motor is an electric motor and the control means provides for electric control.

* * * * *